United States Patent [19]
Lin

[11] Patent Number: 6,121,956
[45] Date of Patent: Sep. 19, 2000

[54] DUSTLESS MOUSE

[76] Inventor: Chun Horng Lin, 19222 Tranbarber St., Rowland Heights, Calif. 91748

[21] Appl. No.: 09/078,312

[22] Filed: May 13, 1998

[51] Int. Cl.⁷ .................................................. G09G 5/08
[52] U.S. Cl. ........................... 345/163; 345/164; 345/167
[58] Field of Search .................................. 345/163, 164, 345/165, 166, 167

[56] References Cited

U.S. PATENT DOCUMENTS

| | | | |
|---|---|---|---|
| 3,789,218 | 1/1974 | Blount | 345/167 |
| 4,801,931 | 1/1989 | Schmidt | 345/167 |

*Primary Examiner*—Richard A. Hjerpe
*Assistant Examiner*—Duc Dinh
*Attorney, Agent, or Firm*—Pro-Techtor International Services

[57] ABSTRACT

A dustless mouse comprises: a circuit, a horizontal conic rolling wheel, a vertical conic rolling wheel, a pressured conic rolling wheel, a round ball and a shell, when the prior mouse is slid, then the rubber round ball will roll, thus it will friction with pulleys on all parts thereof, therefore, user's commands are transferred and completed. However, for a long time, the dust will accumulate between the pulleys and the rubber round ball so to reduce the sensitivity of the mouse, in consequence, the cursor on the screen will not easy to move. In the present invention, an improvement is performed, in which a conic rolling wheel is used to substitute the pulley so that the angle between the conic rolling wheel and the rubber round ball is enlarged, therefore, the conic tip will not easy to accumulate dust and dirt, thus the dust and dirt are not easy to accumulate between the rolling wheel and rubber round ball. The sliding function of the mouse is also not affected. Thus the dustless mouse effect is achieved.

1 Claim, 5 Drawing Sheets

DUSTLESS MOUSE

BACKGROUND OF THE INVENTION

1. Field of the Invention

The present invention relates to a dustless mouse especially to a mouse in which the dust and dirt are prevented to accumulate on the axial rod of the inner X and Y rolling axis.

2. Description of the Prior Art

Recently, mouse is more and more popular, but other then keyboard, the mouse is also a primary tool for operating a computer. The convenience of the mouse is fully appeared during operation of a computer. However, if the mouse has faults or is non-sensitive, even the cursor will motion irregularly or be motionless, thus the user will waste much time for clearing the inner part of the mouse or searching reasons of faults.

A prior mouse includes a horizontal rolling axis, a vertical rolling axis, a pressure absorption rolling axis, a rubber round ball and a shell, characteristic in that the rubber round ball is rolled within the mouse with the sliding of the mouse so to rub with all axes, then through the conversion by a circuit, the cursor will move on the computer screen, thus the operation is completed, the main defects of this design is that: in the table or pad, after the ball has contacted with dust, fiber, sweat or oil dirt, they are easy to adhere on the surface of the ball and then enter into the inner part of the mouse, since they are contacted continuously with the horizontal rolling axis, vertical rolling axis and pressure absorption rolling axis, oil dirt gradually accumulate on the surface of the rolling axes, when the dirt accumulate to some quantity, the mouse will be slid insensitively, ever more the cursor may be move irregularly or motionless.

Apparently, the prior mouse still has many defects needed to be improved.

SUMMARY OF THE INVENTION

Accordingly, the object of the present invention is to provide a dustless mouse, in which the dust, fiber sweat and oil dirt will not accumulate with the sliding of the mouse so to accumulate between the inner round ball and the X and Y rolling axes, therefore, the sensitivity of the mouse will be retained.

Another object of the present invention is to provide a dustless mouse, by the design of the tip of a conic rolling wheel, the accumulated dust will be reduced to minimum, thus the consumer will save the time required for clearing a mouse, and the utility of a mouse is improved.

Therefore, the mouse of the present invention dustless mouse comprises: a circuit, a horizontal conic rolling wheel, a vertical conic rolling wheel, a pressured conic rolling wheel, a round ball and a shell. In the present invention, an improvement is performed, in which a conic rolling wheel is used to substitute the pulley so that the angle between the conic rolling wheel and the rubber round ball is enlarged, therefore, the conic tip will not easy to accumulate dust and dirt, thus the dust and dirt are not easy to accumulate between the rolling wheel and rubber round ball. The sliding function of the mouse is also not affected. Thus the dustless mouse effect is achieved.

In the dustless mouse of the present invention, the three rolling wheels may also be changed as that described above, in which the shape of the three rolling wheels is changed so that the angle between the rolling wheel and the ball is also changed.

The present invention will be better understood and its numerous objects and advantages will become apparent to those skilled in the art by referencing to the following drawings in which:

BRIEF DESCRIPTION OF THE DRAWINGS

The present invention will be better understood and its numerous objects and advantages will become apparent to those skilled in the art by referencing to the following drawings in which.

DETAILED DESCRIPTION OF THE PREFERRED EMBODIMENT

Figure 1:
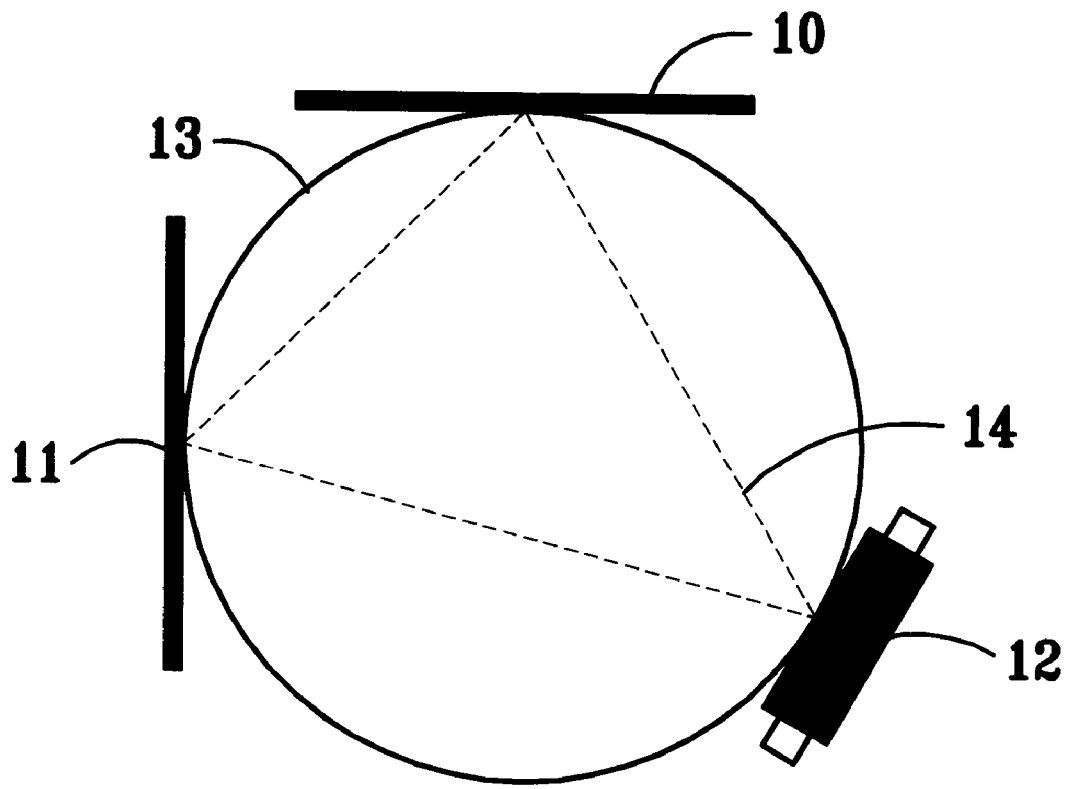
FIG. 1 shows the inner sliding components of a prior mouse.
Figure 2A:
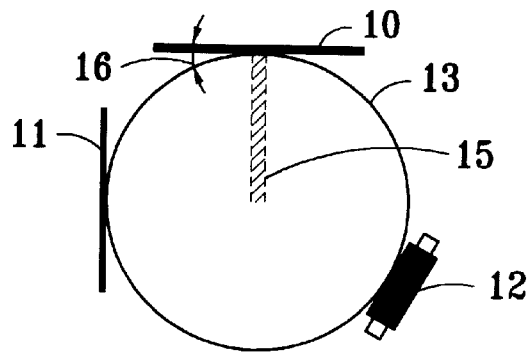
FIGS. 2a–d shows the dirt accumulation of a prior mouse.
Figure 2B:
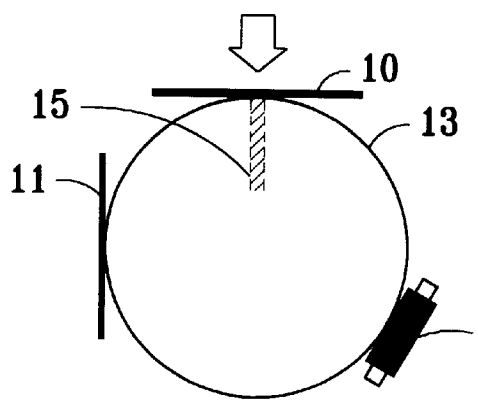
Figure 2C:
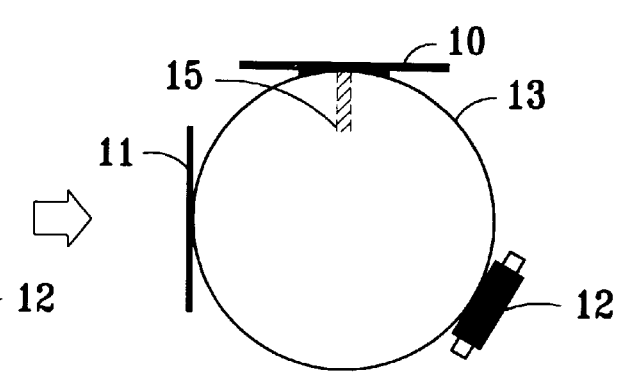
Figure 2D:
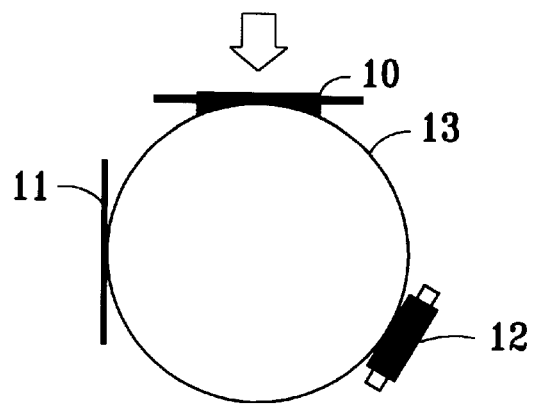

Referring to FIG. 1, the inner sliding components of a prior mouse are shown, wherein the mouse comprises a horizontal rolling axis 10, a vertical rolling axis 11, a pressure absorption rolling axis 12 and a rubber round ball 13, in which the three rolling axis are all in the same horizontal plane to form a rectangular plane 14 and a rubber round ball 13 is arranged between table surface and the rectangular plane 14. When the user moves the mouse in his hand, by the rotation of the rubber round ball 13 to drive the horizontal rolling axis 10 and the vertical rolling axis 11 to rotate in the respective horizontal and vertical directions, and these actions is converted by a circuit so to control a computer, thus the user's command is transferred and completed, wherein the pressure absorption rolling axis 12 can be used absorbed the pressure caused by the contact between the rubber round ball 13 and the table surface.

Referring to FIG. 2a–d, the dirt 15 accumulation of a prior mouse is shown, When the Dirt 15 is adhered on the surface of the rubber round ball 13, it will enter into the inner part of the mouse with the rotation of the ball, since the continuous contacts of the horizontal rolling axis 10, vertical rolling axis 11, and pressure absorption rolling axis 12, and further since the angle X16 between the rubber round ball 13 and the rolling axis is too small, thus the contact surface is too large, thus the dirt 15 will accumulate gradually on the rolling axis so that the structure will be hindered or to induce by a too small friction force and thus the cursor may be slid unsuccessfully.

Figure 3:
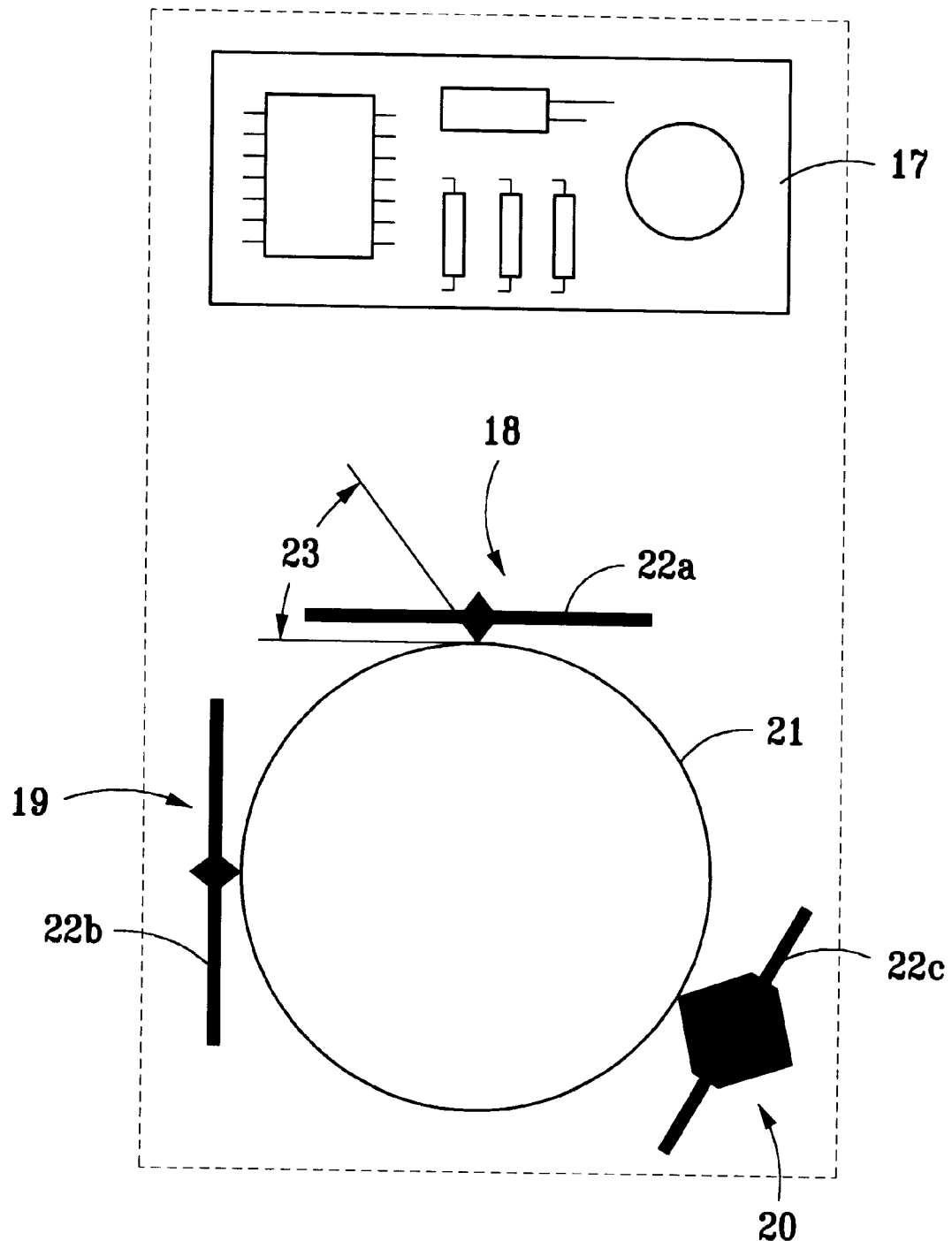
FIG. 3 shows the inner sliding components of mouse of the present invention.

Referring to FIG. 3, the inner structure of dustless mouse of the present invention is shown, wherein the dustless mouse comprises a circuit 17, a horizontal conic rolling wheel 18, a vertical conic rolling wheel 19, a pressured conic rolling wheel 20 and a rubber round ball 21, , wherein each of the three conic rolling wheels includes a bearing 22a–22c, respectively. When the user moves the mouse in his hand, by the rotation of the rubber round ball 21 to drive the horizontal conic rolling wheel 18 and the vertical conic rolling wheel 19 to rotate in the respective horizontal and vertical directions, thus the user's command is transferred and completed, wherein the pressured conic rolling wheel 20 can be used absorbed the upward pressure caused by the contact between the rubber round ball 21 and the table surface. The difference between mouse of the present invention and the conventional mouse is that the present invention has an additional angle B23 and the conic tip is not easy to accumulate dust and dirt so that the dust and dirt are not easy to accumulate between the rolling wheel and rubber round ball 21.

Figure 4:
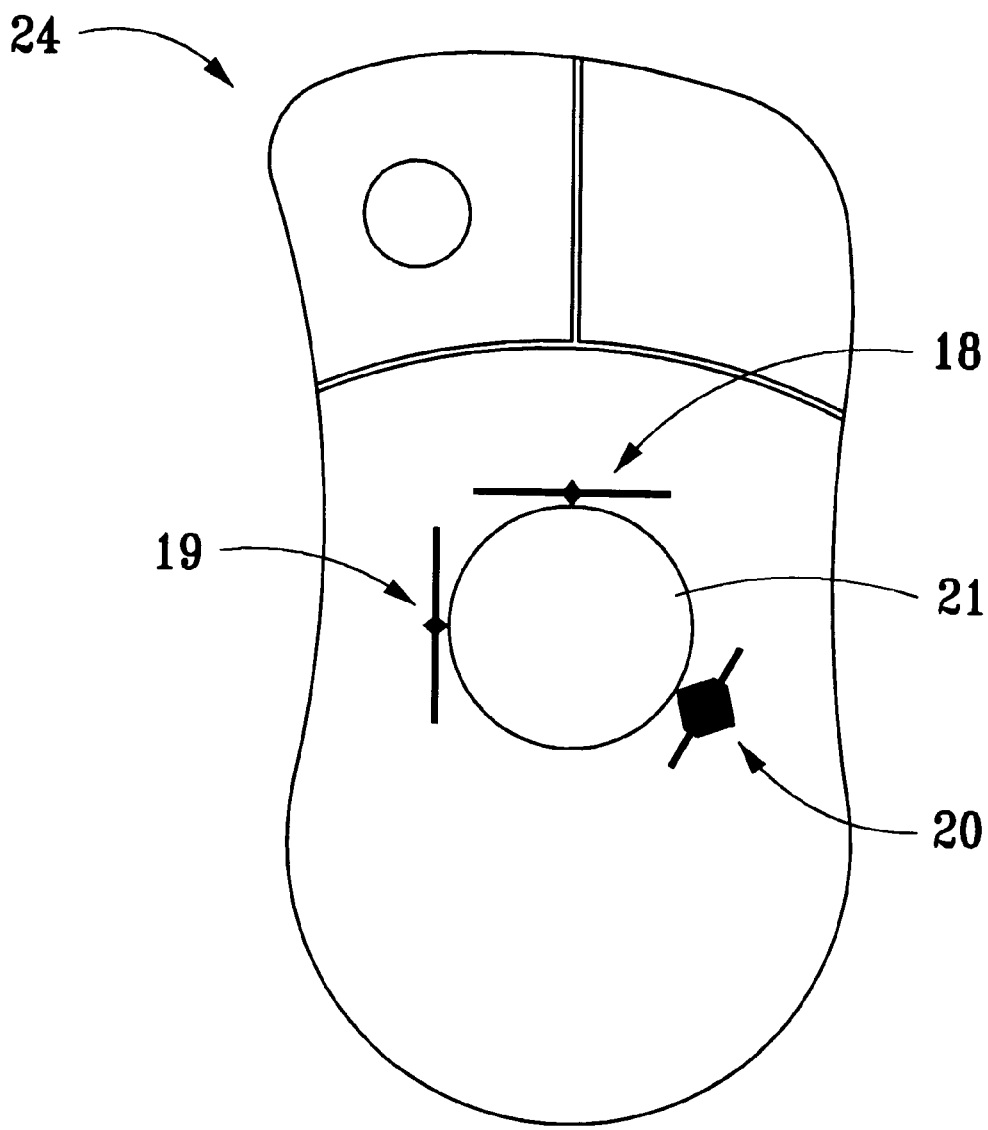
FIG. 4 is an assembled perspective view of the dustless mouse in the present invention.

Referring to FIG. 4, a assembled perspective view of a dustless mouse is shown, the improved a horizontal conic rolling wheel 18, a vertical conic rolling wheel 19, a pressured conic rolling wheel 20 and a rubber round ball 21 are arranged within the mouse shell 21. During sliding, since an angle B23 is added, thus the gap between each conic rolling wheel and the rubber round ball 21 is increased and the conic tip will not easy to accumulate dust and dirt, thus the dust and dirt are not easy to accumulate between the rolling wheel and rubber round ball 21.

Figure 5:
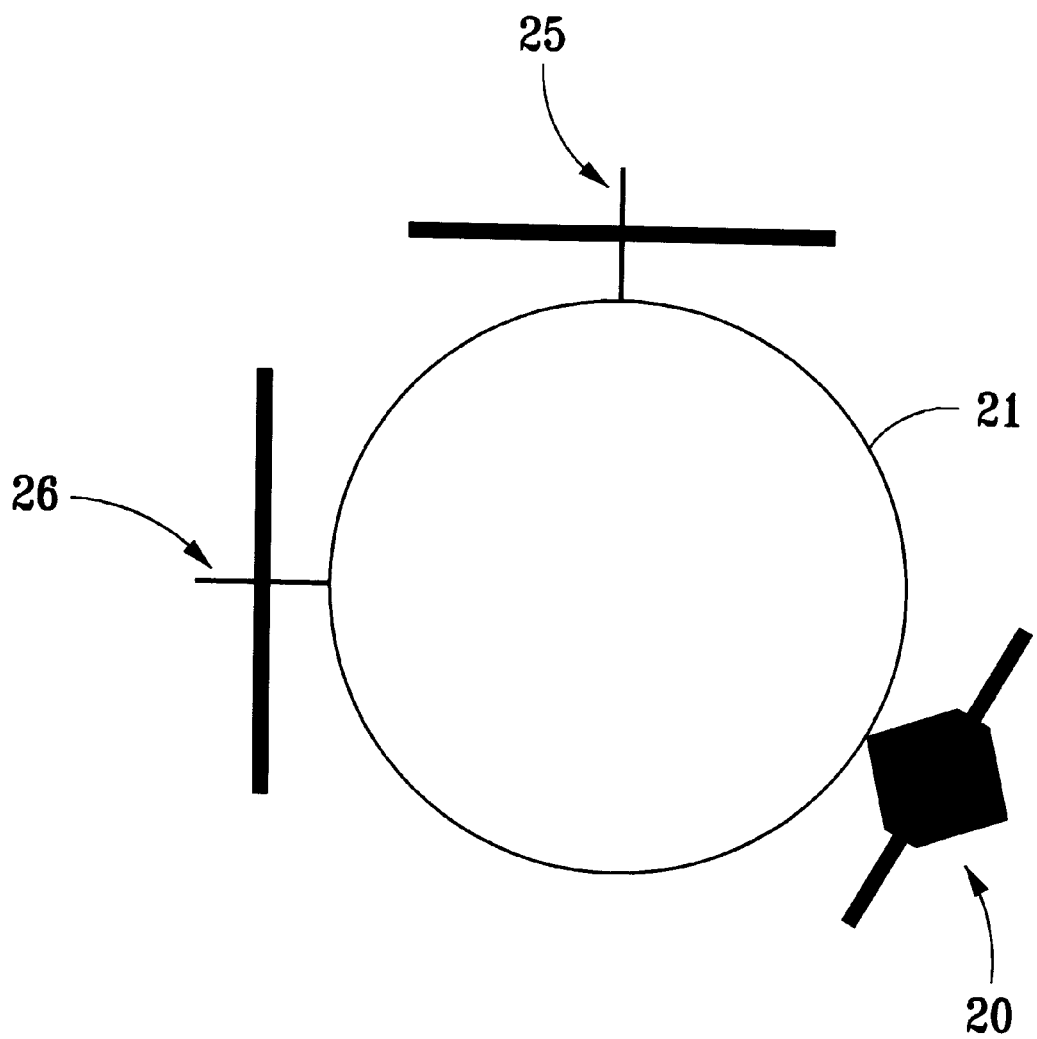
FIG. 5 is another embodiment of the dustless mouse.

Referring to FIG. 5, another embodiment of a dustless mouse is shown, wherein an improved horizontal conic rolling wheel 14 and an improved vertical conic rolling wheel 16 are used as the components of the round ball, this design conforms the theory that any three points which are not on the same line will form a plane, and the sliding function of the mouse is also not affected. Thus the dustless mouse effect is achieved.

As comparing with the prior mouse, the dustless mouse of the present invention has the following advantages: in using, the dust, fiber sweat and oil dirt will not accumulate with the sliding of the mouse so to accumulate between the inner round ball and the rolling wheel, and the ill operation of the mouse may be prevented, therefore, the sensitivity of the mouse will be retained. Another, the clearing time may be saved for the user, in consequence, the work can be performed continuously.

Although certain preferred embodiment of the present invention has been shown and described in detail, it should be understood that various changes and modification may be made therein without departing from the scope of the appended claims.

What is claimed is:

1. A dustless trackball comprising:

a controlling circuit, a horizontal motion sensing means comprising a first conic rolling wheel, a motion sensing means comprising a second vertical conic rolling wheel, a pressure absorption conic rolling wheel, a round ball, and a shell forming a housing for components of said trackball, wherein said three conic rolling wheels contact said round ball only at the tip of their respective conical structures, thereby minimizing a contact area between said three conic rolling wheels and said round ball.

* * * * *